(12) United States Patent
Pan et al.

(10) Patent No.: US 9,148,248 B2
(45) Date of Patent: Sep. 29, 2015

(54) METHOD AND DEVICE FOR FEEDING BACK CHANNEL INFORMATION OF A PLURALITY OF CARRIERS

(75) Inventors: Xueming Pan, District Beijing (CN); Zukang Shen, District Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 509 days.

(21) Appl. No.: 13/521,662

(22) PCT Filed: Dec. 31, 2010

(86) PCT No.: PCT/CN2010/080575
§ 371 (c)(1),
(2), (4) Date: Jul. 11, 2012

(87) PCT Pub. No.: WO2011/082646
PCT Pub. Date: Jul. 14, 2011

(65) Prior Publication Data
US 2013/0039197 A1 Feb. 14, 2013

(30) Foreign Application Priority Data
Jan. 11, 2010 (CN) .......................... 2010 1 0033773

(51) Int. Cl.
*H04L 12/26* (2006.01)
*H04L 1/00* (2006.01)
(Continued)

(52) U.S. Cl.
CPC .............. *H04L 1/0026* (2013.01); *H04L 1/003* (2013.01); *H04L 1/0029* (2013.01);
(Continued)

(58) Field of Classification Search
CPC ...... H04L 43/50; H04L 12/2697; H04L 47/10
USPC ........................................................ 370/252
See application file for complete search history.

(56) References Cited

U.S. PATENT DOCUMENTS

2008/0219370 A1* 9/2008 Onggosanusi et al. ....... 375/260
2009/0296644 A1 12/2009 Cheon et al.
(Continued)

FOREIGN PATENT DOCUMENTS

CN 101005343 A 7/2007
WO 2008127166 A2 10/2008
(Continued)

OTHER PUBLICATIONS

European Search Report for European counterpart application 10641989.6.
(Continued)

*Primary Examiner* — Christopher R Crompton
(74) *Attorney, Agent, or Firm* — Kilpatrick Townsend & Stockton LLP

(57) ABSTRACT

There is a method and device for scheduling channel information feedback to perform a feedback of channel information of a plurality carriers, wherein the method for feeding back channel information includes: a user equipment measuring channel information over a plurality of downlink carriers; upon reception of an instruction to trigger a feedback of channel information transmitted from a base station, the user equipment transmitting to the base station the measured channel information of corresponding downlink carriers in an obtained set of downlink carriers required to be measured and fed back.

19 Claims, 11 Drawing Sheets

(51) Int. Cl.
*H04L 5/00* (2006.01)
*H04W 24/10* (2009.01)
*H04L 1/16* (2006.01)

(52) U.S. Cl.
CPC ............ *H04L 1/0031* (2013.01); *H04L 5/0053* (2013.01); *H04L 1/0067* (2013.01); *H04L 1/0071* (2013.01); *H04L 1/0072* (2013.01); *H04L 1/1664* (2013.01); *H04L 1/1671* (2013.01); *H04W 24/10* (2013.01)

(56) References Cited

U.S. PATENT DOCUMENTS

| | | | |
|---|---|---|---|
| 2010/0027456 A1* | 2/2010 | Onggosanusi et al. | 370/312 |
| 2010/0039953 A1* | 2/2010 | Zhang | 370/252 |
| 2011/0128942 A1* | 6/2011 | Kim et al. | 370/329 |
| 2012/0044894 A1* | 2/2012 | Ko et al. | 370/329 |

FOREIGN PATENT DOCUMENTS

| | | |
|---|---|---|
| WO | 2009/002087 A1 | 12/2008 |
| WO | 2010/016698 A2 | 2/2010 |

OTHER PUBLICATIONS

Office Action for European counterpart application 10841989.6.

"Draft 3GPP TS 36.212 V8.7.0 (May 2009)", 3GPP Draft; Draft 36212-870, 3rd Generation Partnership Project (3GPP), Mobile Competence Centre ; 650, Route Des Lucioles ; F-06921 Sophia-Antipolis CEOEX ; France, Jun. 2, 2009, XP050338735, [retrieved on Jun. 2, 2009 ].

"Draft 3GPP TS 36.213 V8. 7.0 (May 2009) ", 3GPP Draft; Draft 36213-870, 3rd Generation Partnership Project (3GPP), Mobile Competence Centre , 650, Route Des Lucioles ; F-06921 Sophia-Antipolis Cedex , France, Jun. 2, 2009, XP050338736, [retrieved on May 2, 2669 ].

* cited by examiner

METHOD AND DEVICE FOR FEEDING BACK CHANNEL INFORMATION OF A PLURALITY OF CARRIERS

The present application is a US National Stage of International Application No. PCT/CN2010/080575, filed on 31 Dec. 2010, designating the United States, and claiming the benefit of Chinese Patent Application no. 201010033773.1, filed with the Chinese Patent Office on Jan. 11, 2010 and entitled "Method and device for feeding back channel information of a plurality of carriers", which is hereby incorporated by reference in its entirety.

FIELD OF THE INVENTION

The present invention relates to the field of communication technologies and particularly to a method and device for feeding back channel information of a plurality of carriers.

BACKGROUND OF THE INVENTION

In the LTE R8, a system supports transmission over a single carrier, and therefore a User Equipment (UE) also measures a channel quality of a single downlink carrier and feeds back a measurement result including Rank Indication (RI) information, Channel Quality Indictor (CQI) information, Precoding Matrix Indication (PMI) information, etc. A specific feedback can be fed back periodically over a Physical Uplink Control Channel (PUCCH) or non-periodically over a Physical Uplink Shared Channel (PUSCH).

In the LTE R8, there are a variety of different feedback modes in which channel information is fed back non-periodically over a PUSCH, and a specific CQI/PMI feedback mode is defined as depicted in Table 1 below, where the connection symbol "/" represents a feedback of one or both of a CQI and a PMI:

TABLE 1

|  |  | PMI feedback type | | |
|---|---|---|---|---|
|  |  | No PMI | Single PMI | Plural PMIs |
| PUSCH CQI feedback type | Wideband CQI |  |  | 1-2 |
|  | UE selected sub-band CQI | 2-0 |  | 2-2 |
|  | Upper-layer configured sub-band CQI | 3-0 | 3-1 |  |

Particularly there are limited feedback modes available in each transmission mode as particularly specified below, where a UE adopts in a certain transmission mode a specific feedback mode configured by a base station in upper-layer signaling.

Transmission modes correspond to feedback modes as follows:
Transmission mode 1: Feedback triodes 2-0 and 3-0
Transmission mode 2: Feedback modes 2-0 and 3-0
Transmission mode 3: Feedback modes 2-0 and 3-0
Transmission mode 4: Feedback modes 1-2, 2-2 and 3-1
Transmission mode 5: Feedback mode 3-1
Transmission mode 6: Feedback modes 1-2, 2-2 and 3-1
Transmission mode 7: Feedback modes 2-0 and 3-0
Here the seven transmission modes are respectively as follows:
Transmission mode 1: Single antenna port for which Port 0 is used
Transmission mode 2: Transmission diversity
Transmission mode 3: Opened-loop spatial multiplexing
Transmission mode 4: Closed-loop spatial multiplexing
Transmission mode 5: MU-MIMO
Transmission mode 6: Closed-loop spatial multiplexing (Rank=1)
Transmission mode 7: Single antenna port for which Port 5 is used An RI is fed back only in the transmission modes 3 and 4; and an RI (Rank Indication) is 1-bit information when a base station configures two antenna ports, and the RI is 2-bit information when the base station configures four antenna ports.

A UE feeds back over a PUSCH a CQI/PMI, of which a length in bits is dependent upon a specific feedback mode and the number of sub-bands defined in a system, and the UE parses firstly RI information over the PUSCH and then CQI/PMI information in a format corresponding to the index of a rank.

The feedback mode 1-2 is a "Wideband CQI plus Multiple PMIs" mode including wideband CQI information of one to two space codewords (each codeword of four bits) and PMI information of N sub-bands, where N is the number of sub-bands in a system, as depicted in Table 2 below:

TABLE 2

|  | Bit width | | | |
|---|---|---|---|---|
|  | Two antenna ports | | Four antenna ports | |
| Field | Rank = 1 | Rank = 2 | Rank = 1 | Rank >1 |
| Wideband CQI codeword 0 | 4 | 4 | 4 | 4 |
| Wideband CQI codeword 1 | 0 | 4 | 0 | 4 |
| Pre-coding matrix indication | 2N | N | 4N | 4N |

The feedback mode 2-0 is a "UE selected sub-bands without any PMI" mode including wideband CQI information of one codeword (four bits) and information of one differential CQI (two bits) indicating M UE selected sub-bands, where L is indication information of sub-band indexes of M sub-bands selected from N sub-bands, and both values of N and M depend upon a system bandwidth as standard-specified, as depicted in Table 3 below:

TABLE 3

| Field | Bit width |
|---|---|
| Wideband CQI codeword | 4 |
| Sub-band differential CQI | 2 |
| Position of the M selected sub-bands | L |

The feedback mode 2-2 is a "UE selected sub-bands plus plural PMIs" mode including wideband CQI information of one to two space codewords (each of four bits) and differential CQI information of UE selected sub-bands of one to two space codewords (each of two bits) as well as information of one sub-band PMI and one wideband PMI, as depicted in Table 4 below:

TABLE 4

| Field | Bit width | | | |
|---|---|---|---|---|
| | Two antenna ports | | Four antenna ports | |
| | Rank = 1 | Rank = 2 | Rank = 1 | Rank >1 |
| Wideband CQI codeword 0 | 4 | 4 | 4 | 4 |
| Sub-band differential CQI codeword 0 | 2 | 2 | 2 | 2 |
| Wideband CQI codeword 1 | 0 | 4 | 0 | 4 |
| Sub-band differential CQI codeword 1 | 0 | 2 | 0 | 2 |
| Position of the M selected sub-bands | L | L | L | L |
| Pre-coding matrix indication | 4 | 2 | 8 | 8 |

The feedback mode 3-0 is a "Upper-layer configured sub-bands without any PMI" mode including information of one wideband CQI (four bits) and information of N differential sub-band CQIs (each of two bits), as depicted in Table 5 below:

TABLE 5

| Field | Bit width |
|---|---|
| Wideband CQI codeword | 4 |
| Sub-band differential CQI | 2N |

The feedback mode 3-1 is a "Upper-layer configured sub-bands+a single PMI" mode including wideband CQI information of one to two space codewords (each of four bits), information of N sub-band differential CQIs of one to two space codewords (each of two bits) and information of one PMI, as depicted in Table 6 below:

TABLE 6

| Field | Bit width | | | |
|---|---|---|---|---|
| | Two antenna ports | | Four antenna ports | |
| | Rank = 1 | Rank = 2 | Rank = 1 | Rank >1 |
| Wide-band CQI codeword 0 | 4 | 4 | 4 | 4 |
| Sub-band differential CQI codeword 0 | 2N | 2N | 2N | 2N |
| Wide-band CQI codeword 1 | 0 | 4 | 0 | 4 |
| Sub-band differential CQI codeword 1 | 0 | 2N | 0 | 2N |
| Pre-coding matrix indication | 2 | 1 | 4 | 4 |

Over a PUSCH, RI information is encoded separately, CQI plus PMI information is encoded separately, and ACK or NACK information is also encoded separately, and such uplink control information is multiplexed together with uplink data, as illustrated in FIG. 1a.

After being multiplexed and interleaved, uplink data symbols are mapped to a physical resource by firstly mapping the CPI/PMI information and then mapping the uplink data onto the remaining resource. The ACK/NACK and RI information is mapped by puncturing the uplink data so that the ACK/NACK is placed in four columns of symbols on both sides of a pilot firstly in the time domain and then in the frequency domain in an order from low frequency to high frequency and the RI information is mapped to four columns of symbols immediately next to the ACK/NACK firstly in the time domain and then in the frequency domain in an order from low frequency to high frequency, as illustrated in FIG. 1b.

In an LTE R8 system, non-periodical transmission of a CQI/PMI/RI over a PUSCH is triggered by 1-bit CQI Request information in the DCI format 0. A UE receives this information bit in the DCI format 0, which is set to 1, and then inserts the related CQI/PMI/RI information, organized in an feedback mode configured in advance as described above, into the PUSCH for transmission; otherwise, such information will not be transmitted. A feedback mode in the LTE R9 is defined the same as in the LTE R8, and a detailed description thereof will be omitted here.

For an LTE-Advanced (LTE-A) system, resources of a plurality of LTE carriers (also referred to a component carrier) have to be connected for use to support a wider system bandwidth than the LTE system, and particularly a plurality of consecutive LTE carriers are aggregated to provide the LTE-A with a larger transmission bandwidth, or a plurality of inconsecutive LTE carriers are aggregated to provide the LTE-A with a larger transmission bandwidth. FIG. 2 illustrates an example of aggregating inconsecutive carriers.

Investigation of the organization for standardization currently tends to have such a recognized design of a carrier aggregation system that a design over each carrier is kept as consistent with the LTE Release 8 as possible to thereby ensure that an UE in R8 can operate normally over each component carrier.

A currently investigated demand of the LTE-A system has been established as supported aggregation of at most five component carriers and UE supported concurrent reception/transmission of data over at most five component carriers.

It has been decided in investigation of carrier aggregation to support asymmetric and symmetric uplink and downlink carrier aggregation. Symmetric and asymmetric uplink and downlink carrier aggregation can be configured from the perspective of a system (that is, symmetric or asymmetric uplink and downlink carrier configuration can be supported in the system) or assigned per UE (that is, a UE is assigned with symmetric or asymmetric uplink and downlink carrier configuration). Also in investigation of carrier aggregation, the issue of pairing between uplink and downlink carriers has been proposed in some proposals, as illustrated in FIG. 3a and FIG. 3b, where an arrowed connection between an uplink carrier and a downlink carrier represents a pairing relationship between them so that a downlink carrier can be paired with one or more uplink carriers and an uplink carrier can also be paired with one or more downlink carriers. This pairing relationship can be system-based (that is, there is only a group of pairing relationships in a system) or UE-based (that is, different users can be configured with different pairing relationships).

In summary in the LTE-A system, the technology of aggregating a plurality of carrier parts to assign a spectrum resource due to limited spectrum resources, where the plurality of carrier parts may be distributed consecutively or inconsecutively over the spectrum resources and a characteristic of each carrier part shall comply with a fundamental requirement in the current LTE standard. In order to perform effectively carrier scheduling and link adaptation processes in the LTE-A carrier aggregation system, a base station has to obtain a feedback of channel information of a plurality of carriers measured by a UE to thereby perform multi-carrier scheduling. Particularly the channel information can include, for example, RI information, wideband CQI/PMI information, sub-band CQI information, etc. However the LTE Rel-8/9 protocol supports a channel information feedback of only a single carrier, and there is no design solution available to a non-periodical feedback of channel information of a plurality of carriers in the case of LTE-A carrier aggregation.

SUMMARY OF THE INVENTION

The invention provides a method and device for feeding back channel information of a plurality of carriers to perform a non-periodical feedback of channel information of a plurality of carriers.

An embodiment of the invention provides a method for feeding back channel information of a plurality of carriers, which includes:

a UE measuring channel information over a plurality of downlink carriers; and upon reception of an instruction to trigger a feedback of channel information transmitted from a base station, the UE transmitting to the base station the measured channel information of corresponding downlink carriers in an obtained set of downlink carriers required to be measured and fed back.

An embodiment of the invention provides a device for feeding back channel information of a plurality of carriers, which includes:

a first receiving unit configured to receive a set of downlink carriers, required to be measured and fed back, transmitted from a base station;

a second receiving unit configured to receive an instruction to trigger a feedback of channel information transmitted from the base station;

a measuring unit configured, upon reception of the instruction to trigger a feedback of channel information transmitted from the base station, to measure channels in an set of downlink carriers required to be measured and fed back; and a feeding-back unit configured to transmit the measured channel information of the downlink carriers to the base station.

An embodiment of the invention provides a method for scheduling a feedback of channel information, which includes:

a base station notifying a UE of a set of downlink carriers required to be measured and fed back;

the base station transmitting to the UE a message to trigger downlink channel information to be measured, wherein the downlink channel information is channel information of downlink carriers in the set of downlink carriers; and the base station receiving the channel information of the downlink carriers measured by the UE.

An embodiment of the invention provides a device for scheduling a feedback of channel information, which includes:

a first transmitting configured to notify a UE of a set of downlink carriers required to be measured and fed back;

a second transmitting unit configured to transmit to the UE a message to trigger downlink channel information to be measured, wherein the downlink channel information is channel information of downlink carriers in the set of downlink carriers; and a receiving unit configured to receive the channel information of the downlink carriers measured by the UE.

In the embodiments of the invention, a UE measures channel information over a plurality of downlink carriers; and upon reception of an instruction to trigger a feedback of channel information transmitted from a base station, the UE transmits to the base station the measured channel information of corresponding downlink carriers in an obtained set of downlink carriers required to be measured and fed back to thereby feed back the channel information of the plurality of carriers.

DETAILED DESCRIPTION OF THE EMBODIMENTS

In embodiments of the invention, in order to feed back channel information of a plurality of carriers, a base station notifies in advance a UE of a set of downlink carriers required to be measured and fed back; the base station transmits to a UE a message, which is used for triggering downlink channel information to be measured, to trigger the UE to measure channels of the downlink carriers; and upon reception of an instruction transmitted from a base station to trigger a feedback of channel information, the UE transmits to the base station the measured channel information of the corresponding downlink carriers in the obtained set of downlink carriers required to be measured and fed back.

Figure 1A:
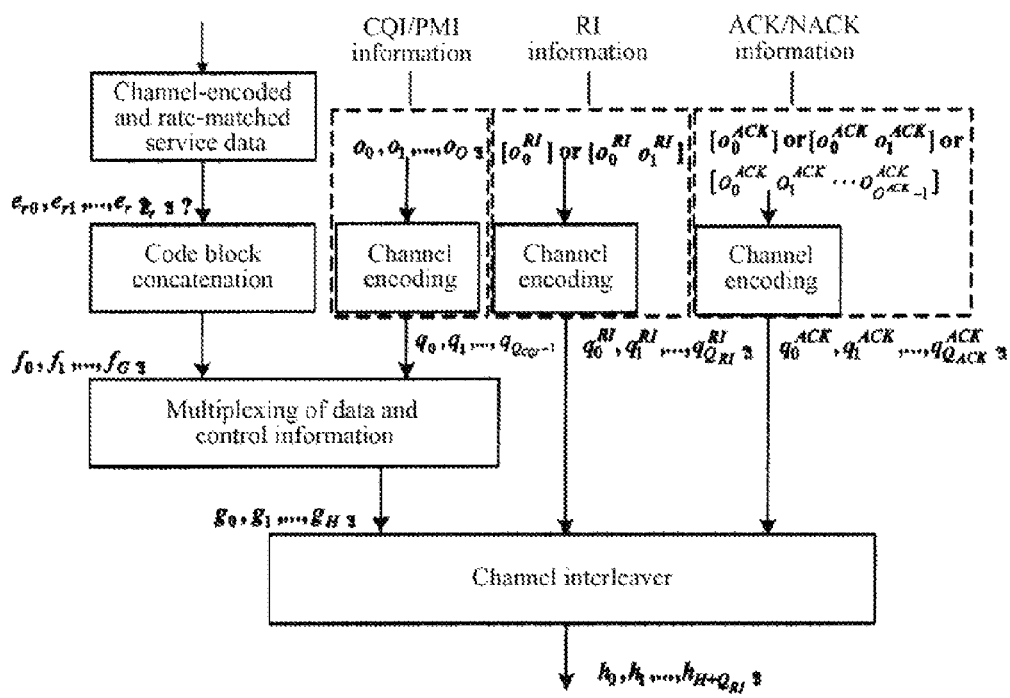
FIG. 1a is a schematic diagram of a process of multiplexing a UCI and uplink data in a single-carrier system.
Figure 1B:
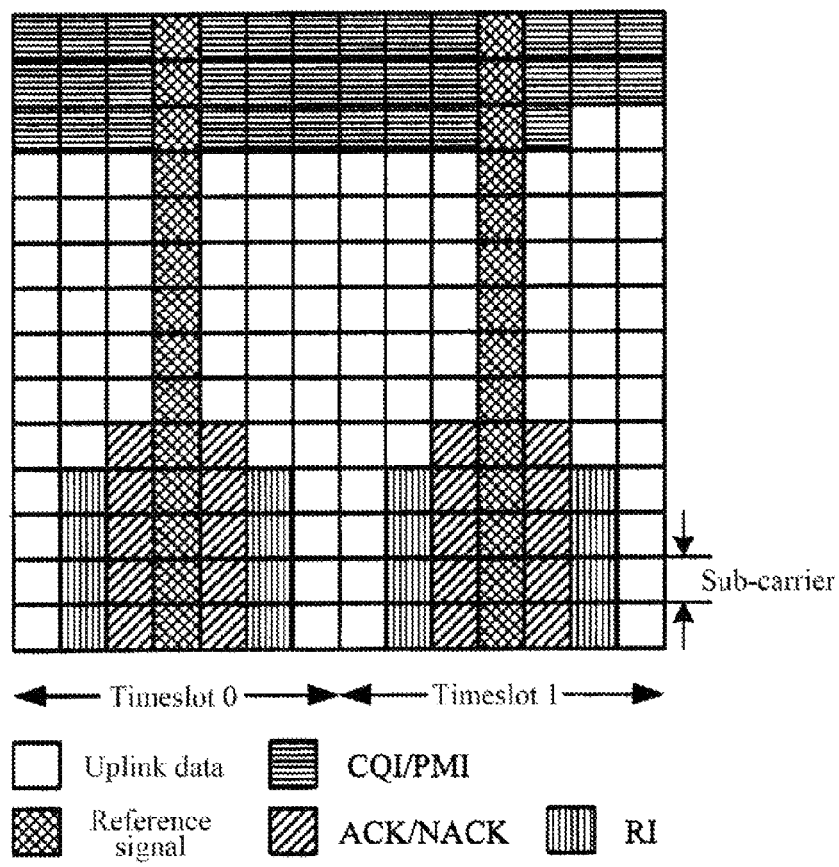
FIG. 1b is a schematic diagram of mapping uplink control information to an uplink physical resource in a single-carrier system.
Figure 2:
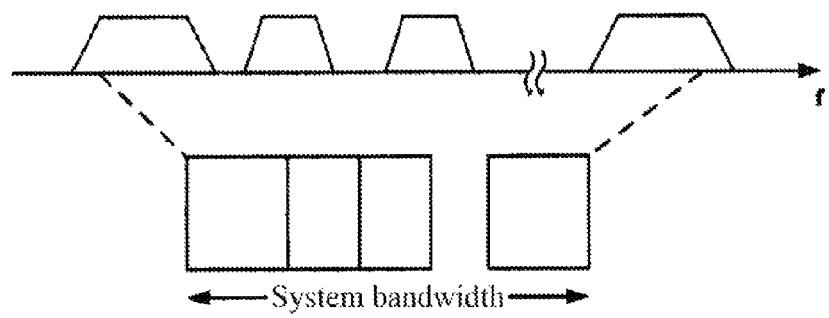
FIG. 2 is a schematic diagram of carrier aggregation.
Figure 3A:
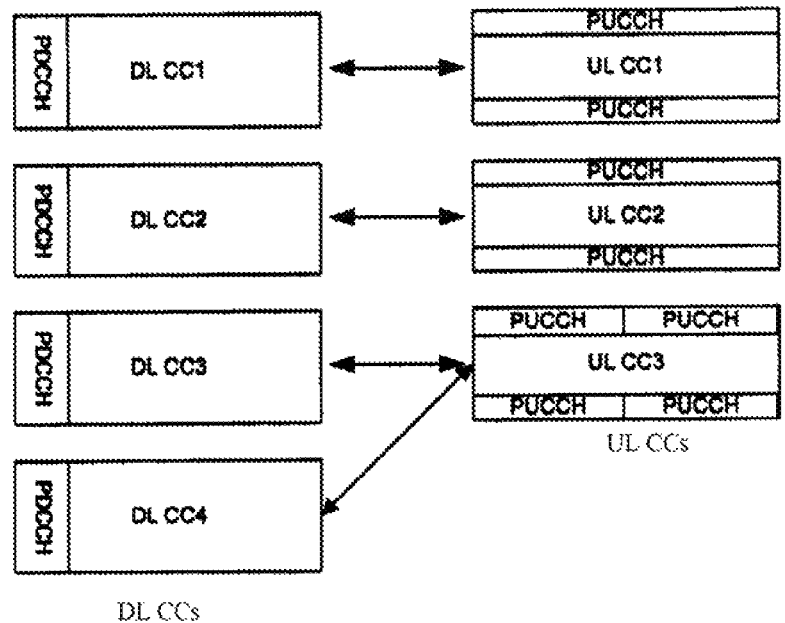
FIG. 3a is a schematic diagram of asymmetric uplink and downlink aggregation and carrier-pairing.
Figure 3B:
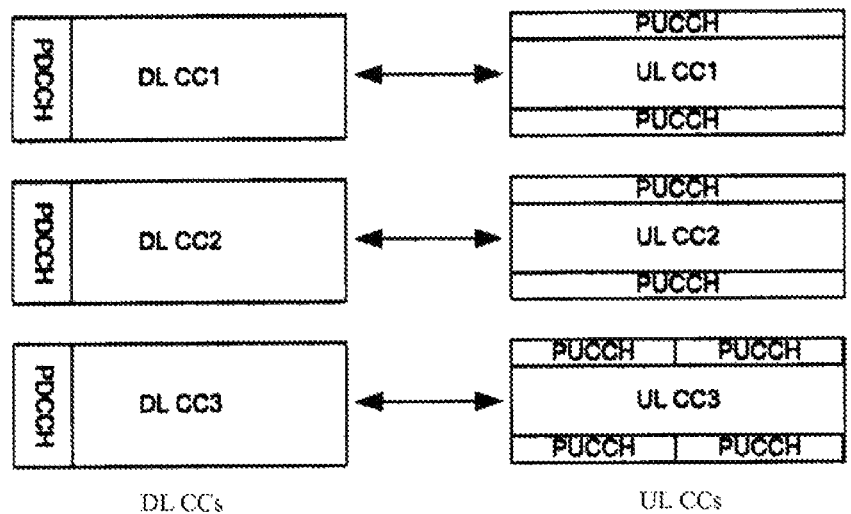
FIG. 3b is a schematic diagram of symmetric uplink and downlink aggregation and carrier-pairing.
Figure 4:
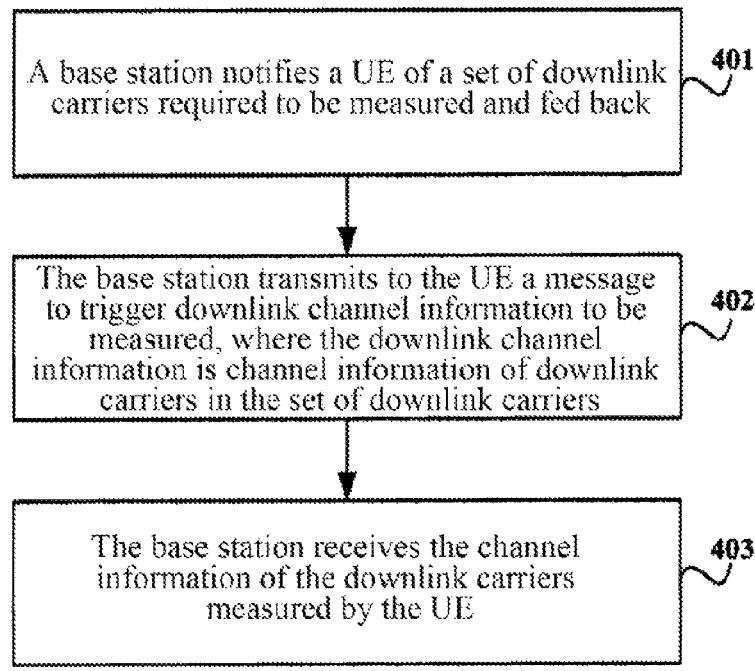
FIG. 4 is a schematic flow chart of a method for scheduling a feedback of channel information performed at the base station side according to an embodiment of the invention.

Referring to FIG. 4, a method for scheduling a feedback of channel information of a plurality of carriers performed at the base station side according to the invention includes the steps of:

Step 101: A base station notifies a UE of a set of downlink carriers required to be measured and fed back.

The base station can transmit the set of downlink carriers to the UE in upper-layer signaling.

Step 402: The base station transmits to the UE a message to trigger downlink channel information to be measured, where the downlink channel information is channel information of downlink carriers in the set of downlink carriers.

The message to trigger the downlink channel information to be measured can be a Downlink Control Information (DCI) message, e.g., the DCI format 0.

Step 403: The base station receives the channel information of the downlink carriers measured by the UE.

In the step 403, extracted data symbols over a physical resource are de-interleaved, de-multiplexed and decoded to obtain the channel information of the respective downlink carriers.

Figure 5:
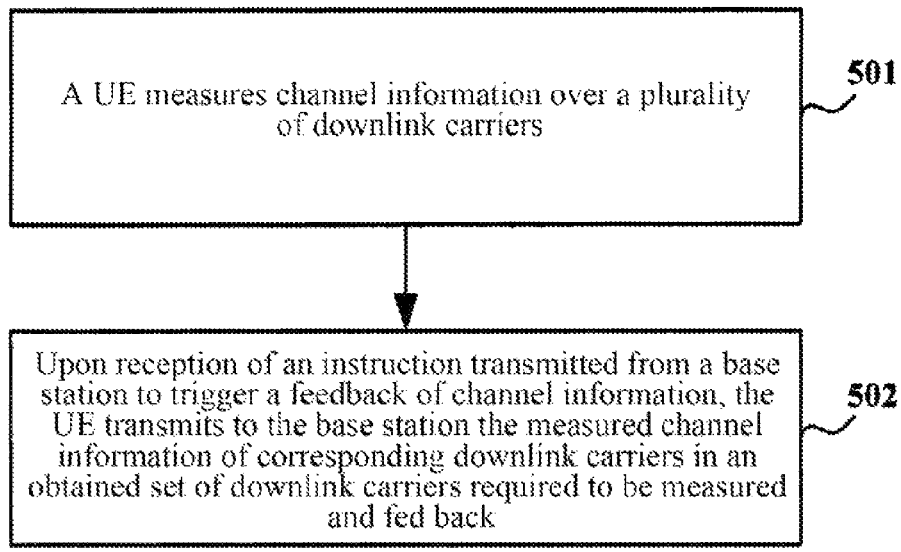
FIG. 5 is a schematic flow chart of a method for feeding back channel information performed at the UE side according to an embodiment of the invention.

Referring to FIG. 5, a method for scheduling a feedback of channel information of a plurality of carriers performed at the UE side according to the invention includes the steps of:

Step 501: A UE measures channel information over a plurality of downlink carriers.

Step 502: Upon reception of an instruction to trigger feedback of channel nation transmitted from a base station, the UE transmits to the base station the measured channel information of corresponding downlink carriers in an obtained set of downlink carriers required to be measured and fed back.

The set of downlink carriers required to be measured and fed back can be configured for the UE by the base station in upper-layer signaling, for example, the base station transmits in advance to the UE the upper-layer signaling including the set of downlink carriers required to be measured and fed back, and the upper-layer signaling can be, for example, Radio Resource Control (RRC) signaling.

In a transmission scheme of the step 502, the channel information of the downlink carriers can include several types of channel feedback information, and if the instruction to trigger a feedback of channel information can include a carrier indicator to indicate uplink carriers occupied for feeding back the respective types of channel information of the downlink carriers, then the UE can transmit the measured channel information of the downlink carriers to the base station over the corresponding uplink carriers.

The channel information of the downlink carriers can include one or more of three types of channel feedback information of a CQI, a PMI and an RI.

In another transmission scheme of the step 502, if no carrier indicator is explicit in the instruction to trigger a feedback of channel information, then the UE receives pairing condition information, of the downlink carriers and uplink carriers, notified from the base station and the UE can transmit the measured channel information of the downlink carriers to the base station over the corresponding uplink carriers paired with the downlink carriers.

The instruction to trigger a feedback of channel information can be the DCI format 0.

In the step 502, the UE can perform multiplexing and interleaving processes on the measured channel information of the downlink carriers and uplink data to be transmitted and map uplink data symbols obtained after the interleaving process onto a corresponding physical resource for transmission.

The UE can perform the multiplexing and interleaving processes on the measured channel information of the downlink carriers and the uplink data to be transmitted in a variety of implementations:

In a first implementation, a code block concatenation process is performed on channel-encoded and rate-matched service data, and the CQI/PMI information of the respective downlink carriers is channel-encoded separately; the separately channel-encoded CQI/PMI information of the respective downlink carriers and the code block concatenation-processed service data are multiplexed; and the interleaving process is performed on the multiplexed data, the separately encoded RI information of the respective downlink carriers and separately encoded ACK/NACK information.

Therefore when the uplink data symbols are mapped onto the physical resource, firstly the separate CQI/PMI information of the respective carriers are mapped sequentially onto the physical resource per Resource Element (RE) firstly in the time domain and then in the frequency domain while different resource elements are occupied for the CQI/PMI information of the respective carriers, the uplink data is mapped onto the remaining physical resource, and the ACK/NACK and RI information is mapped onto the physical resource by puncturing the uplink data. For example, the RI information is mapped onto Single Carrier-Frequency Division Multiple Access (SC-FDMA) symbols on both sides of a DMRS (Demodulation Reference Signal) according to a rule already specified in the LTE R8 by mapping the RI information of the different carriers to different resource elements in an order from low frequency to high frequency while the different resource elements are occupied for the RI information of the respective carriers.

In a second implementation, a code block concatenation process is performed on channel-encoded and rate-matched service data, and the CQI/PMI information of the downlink carriers in the set of downlink carriers is encoded jointly; the jointly encoded CQI/PMI information of the downlink carriers and the code block concatenation-processed service data are multiplexed; and the interleaving process is performed on the multiplexed data, the jointly encoded RI information of the downlink carriers and separately encoded ACK/NACK information. Therefore when the uplink data symbols are mapped onto the physical resource, firstly the joint CQI/PMI information of the respective carriers are mapped sequentially onto the physical resource per RE firstly in the time domain and then in the frequency domain while the same resource elements are occupied for the CQI/PMI information of the respective carriers, the uplink data is mapped onto the remaining physical resource, and the ACK/NACK and RI information is mapped onto the physical resource by puncturing the uplink data while the same resource elements are occupied for the joint RI information of the respective carriers.

In a third implementation, a code block concatenation process is performed on channel-encoded and rate-matched service data, and the CQI/PMI information of the downlink carriers in the set of downlink carriers is encoded jointly; the jointly encoded CQI/PMI information of the downlink carriers and the code block concatenation-processed service data are multiplexed; and the interleaving process is performed on the multiplexed data, the separately encoded RI information of the respective downlink carriers and separately encoded ACK/NACK information. When the uplink data symbols are mapped onto the physical resource, firstly the joint CQI/PMI information of the respective carriers are mapped sequentially onto the physical resource per RE firstly in the time domain and then in the frequency domain while the same resource elements are occupied for the CQI/PMI information of the respective carriers, the uplink data is mapped onto the remaining physical resource, and the ACK/NACK and RI information is mapped onto the physical resource by puncturing the uplink data while the different resource elements are occupied for the RI information of the respective carriers.

Figure 6:
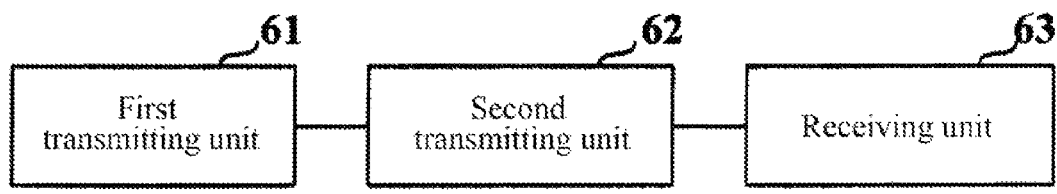
FIG. 6 is a schematic structural diagram of a device for scheduling a feedback of channel information according to an embodiment of the invention.

Reference is made to FIG. 6 illustrating a schematic structural diagram of a device for scheduling a feedback of channel information according to an embodiment of the invention, which includes a first transmitting unit 61, a second transmitting unit 62 and a receiving unit 63.

The first transmitting unit 61 is configured to notify a UE of a set of downlink carriers required to be measured and fed back;

The second transmitting unit 62 is configured to transmit to the UE a message to trigger downlink channel information to be measured, where the downlink channel information is channel information of downlink carriers in the set of downlink carriers; and The receiving unit 63 is configured to receive the channel information of the downlink carriers measured by the UE.

The first transmitting unit 61 is configured to transmit the set of downlink carriers to the UE in upper-layer signaling.

The upper-layer signaling can be RRC signaling. The message to trigger the downlink channel information to be measured can be a DCI message.

The receiving unit 63 can de-interleave, de-multiplex and decode extracted data symbols over a physical resource to obtain the channel information of the respective downlink carriers.

Figure 7:
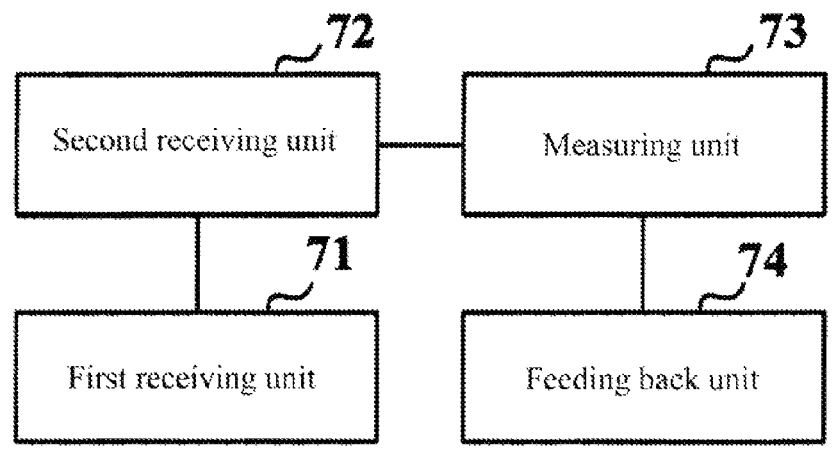
FIG. 7 is a schematic structural diagram of a device for feeding back channel information according to an embodiment of the invention.

Referring to FIG. 7, a device for feeding back channel information of a plurality of carriers according to an embodiment of the invention includes:

A first receiving unit 71 configured to receive a set of downlink carriers, required to be measured and fed back, transmitted from a base station;

A second receiving unit 72 configured to receive an instruction to trigger a feed back of channel information transmitted from the base station;

A measuring unit 73 configured to measure channel information over a plurality of downlink carriers; and A feeding-back unit 74 configured, upon reception of the instruction to trigger a feedback of channel information transmitted from the base station, to transmit to the base station the measured channel information of the corresponding downlink carriers in an set of downlink carriers required to be measured and fed back.

The first receiving unit 71 is configured to obtain the set of downlink carriers required to be measured and fed back from received upper-layer signaling transmitted from the base station.

The channel information of the downlink carriers includes several types of channel feedback information, and the instruction to trigger a feedback of channel information includes a carrier indicator to indicate uplink carriers occupied for feeding back the respective types of channel information of the downlink carriers, and then the feeding-back unit 74 is configured to transmit the measured channel information of the downlink carriers to the base station over the corresponding uplink carriers.

The channel information of the downlink carriers includes one or more of three types of channel feedback information of a CQI, a PMI and an RI.

The feeding-back unit is configured to transmit the measured channel information of the downlink carriers to the base over corresponding uplink carriers paired with the downlink carriers according to pairing condition information, of the downlink carriers and the uplink carriers, notified from the base station. The instruction to trigger a feedback of channel information is the Downlink Control Information (DCI) format 0.

The feeding-back unit 74 can perform multiplexing and interleaving processes on the measured channel information of the downlink carriers and uplink data to be transmitted, and map uplink data symbols obtained after the interleaving process onto a corresponding physical resource for transmission.

The feeding-back unit 74 can perform a code block concatenation process on channel-encoded and rate-matched service data and channel-encode separately the CQI/PMI information of the respective downlink carriers; multiplex the separately channel-encoded CQI/PMI information of the respective downlink carriers and the code block concatenation-processed service data; and perform the interleaving process on the multiplexed data, the separately encoded RI information of the respective downlink carriers and separately encoded ACK/NACK information. When the uplink data symbols are mapped onto the physical resource, the feeding-back unit 74 firstly maps the separate CQI/PMI information of the respective carriers sequentially onto the physical resource per RE firstly in the time domain and then in the frequency domain while different resource elements are occupied for the CQI/PMI information of the respective carriers, maps the uplink data onto the remaining physical resource and maps the ACK/NACK and RI information onto the physical resource by puncturing the uplink data.

The feeding-back unit 74 can perform a code block concatenation process on channel-encoded and rate-matched service data and encode jointly the CQI/PMI information of the downlink carriers in the set of downlink carriers; multiplex the jointly encoded CQI/PMI information of the downlink carriers and the code block concatenation-processed service data; and perform the interleaving process on the multiplexed data, the jointly encoded RI information of the downlink carriers and separately encoded ACK/NACK information.

When the uplink data symbols are mapped onto the physical resource, the feeding-back unit 74 firstly maps the joint CQI/PMI information of the respective carriers sequentially onto the physical resource per RE firstly in the time domain and then in the frequency domain while the same resource elements are occupied for the CQI/PMI information of the respective carriers, maps the uplink data onto the remaining physical resource and maps the ACK/NACK and RI information onto the physical resource by puncturing the uplink data while the same resource elements are occupied for the joint RI information of the respective carriers.

The feeding-back unit 74 can perform a code block concatenation process on channel-encoded and rate-matched service data and encode jointly the CQI/PMI information of the downlink carriers in the set of downlink carriers; multiplex the jointly encoded CQI/PMI information of the downlink carriers and the code block concatenation-processed service data; and perform the interleaving process on the multiplexed data, the separately encoded RI information of the respective downlink carriers and separately encoded ACK/NACK information.

When the uplink data symbols are mapped onto the physical resource, the feeding-back unit 74 firstly maps the joint CQI/PMI information of the respective carriers sequentially onto the physical resource per RE firstly in the time domain and then in the frequency domain while the same resource elements are occupied for the CQI/PMI information of the respective carriers, maps the uplink data onto the remaining physical resource and maps the ACK/NACK and RI information onto the physical resource by puncturing the uplink data while different resource elements are occupied for the RI information of the respective carriers.

The technical solution of the invention will be detailed below in connection with embodiments thereof.

In an embodiment of the invention, a UE uses a non-periodical CQI/PMI/RI to feed back a requirement to support a plurality of carriers when a UE is configured with enabled carrier aggregation in an LTE-A system. Firstly a base station will configure different Downlink Component Carriers (DL CCs) with non-periodical feedback modes, and the feedback modes of the respective CCs may be the same or different. Specific modes are the same as in the LTE R8/9.

When the base station is going to schedule the UE to feed back channel information of a plurality of DL CCs, the base station can pre-configure in upper-layer signaling a set of DL CCs required to be measured and fed back by the UE in a non-periodical feedback mode and use 1-bit CQI Request signaling in the DCI format 0to trigger a CQI/PMI/RI feedback of respective CCs in the set; and also a Carrier Indication Field (CIF) in the DCI format 0 indicates a specific UL CC over which a CQI/PMI/RI feedback is transmitted; and if the CIF is absent, then feedback information is transmitted over a UL CC paired with a DL CC where the DCI format 0resides. Particularly the upper-layer signaling can be UE-specific RRC signaling. The UE feeds back CQI/PMI/RI information of the corresponding set of DL CCs over the Uplink Component Carriers (UL CCs) configured by upper-layer in response to the trigger of the DCI format 0.

The CQI Request signaling in the DCI format is extended to a plurality of bits to indicate specific DL CCs for which CQI/PMI/RI information is required to be included in a non-periodical feedback, for example, aggregation of at most five DL CCs is supported in the LTE-A, and then 5-bit CQI Request information indicates in a bitmap mode specific DL CCs for which the channel information is included in a non-periodical feedback. That is, the set of downlink carriers required to be measured and fed back is indicated in a plurality of bits extended in the Channel Quality Indication (CQI) request signaling of the DCI format 0, in a bitmap mode.

The channel information of all the DL CCs paired with a UL CC is fed back over the UL CC when the base station schedules the UE to perform a non-periodical feedback of the channel information.

Figure 8A:
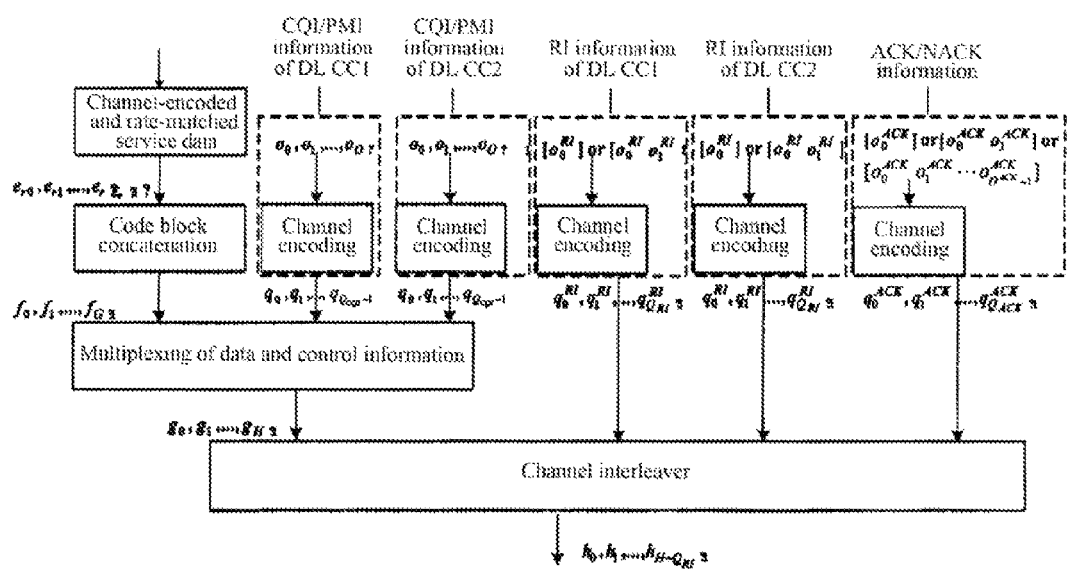
FIG. 8a is a schematic diagram of a process of multiplexing channel quality information of a plurality of carriers and uplink data according to a first embodiment of the invention.

When the UE determines the set of DL CCs required to be fed batik, the UE will multiplex the feedback information and uplink data. Specifically multi-carrier extension is performed based upon the LTE R8. As illustrated in FIG. 8a, a code block concatenation process is performed on channel-encoded and rate-matched service data, and the CQI/PMI information of the respective downlink carriers is channel-encoded separately; the separately channel-encoded CQI/PMI information of the respective downlink carriers and the code block concatenation-processed service data are multiplexed; and an interleaving process is performed on the multiplexed data, the separately encoded RI information of the respective downlink carriers and separately encoded ACK/NACK information.

Figure 8B:
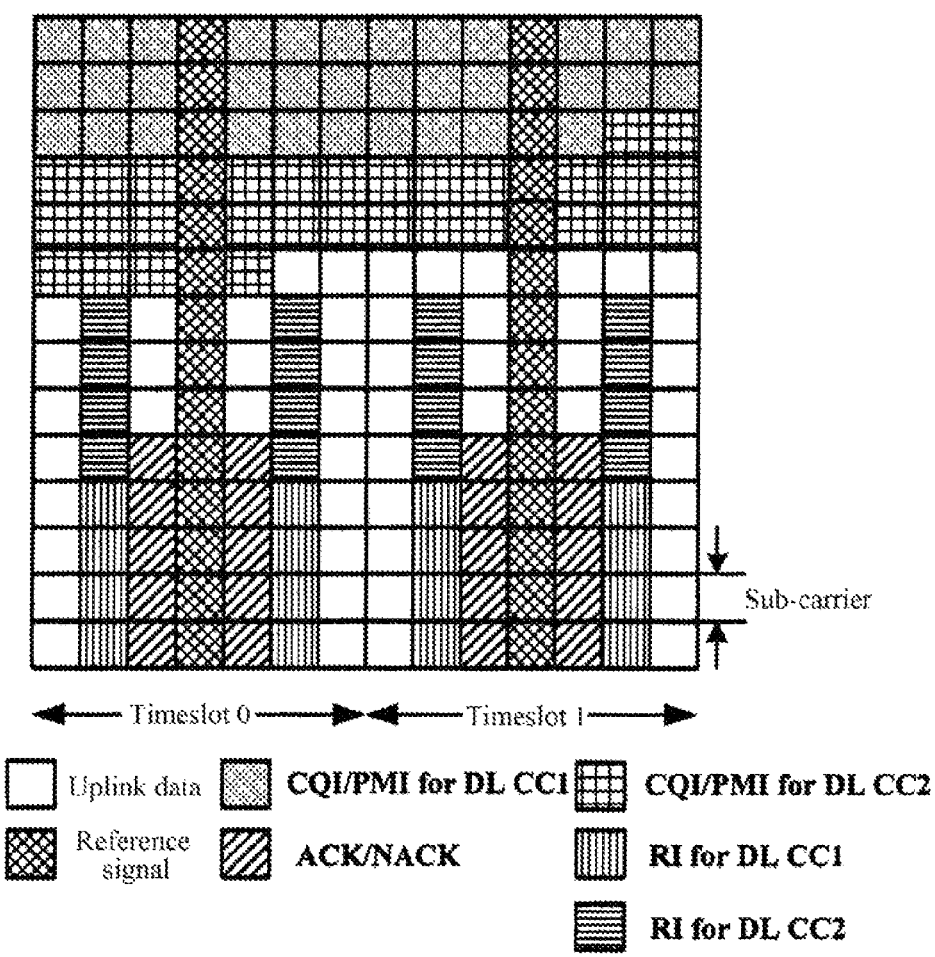
FIG. 8b is a schematic diagram of mapping a feedback of channel information of a plurality of carriers according to the first embodiment of the invention.

As illustrated in FIG. 8b, in the mapping process, the CQI/PMI information of the respective DL CCs in the set of DL CCs is encoded separately in a feedback mode configured by an upper-layer, and a specific encoding mode is the same as in the LTE R8/R9, and then a multiplexing operation is performed uniformly on the CQI/PMI information and the uplink data. Multiplexing is performed to ensure the CQI/PMI information preceding the uplink data and sequential mapping of the CQI/PMI information of the different DL CCs (firstly in the time domain and then in the frequency domain). Data sequences by multiplexing the data and the control information and the RI information of the respective DL CCs go into a channel interleaver, and an input of the interleaver ensures that RIs still be located at the same symbol locations as in the LTE R8 and different resource elements be occupied for the RI information of the respective carriers as well as different resource elements be occupied for the CQI/PMI information of the respective carriers. For example, the RI information of the different carriers is mapped to different resource elements in an order from low frequency to high frequency.

In the foregoing example, the CQI/PMI information of the respective carriers is encoded separately, and also the RI information of the respective carriers is encoded separately. Alternatively, indeed, the CQI/PMI information of the respective carriers can be encoded jointly, and also the RI information of the respective carriers can be encoded jointly. However the CQI/PMI information must be encoded separately from the RI information to thereby ensure higher reliability of the RI information.

Figure 9A:
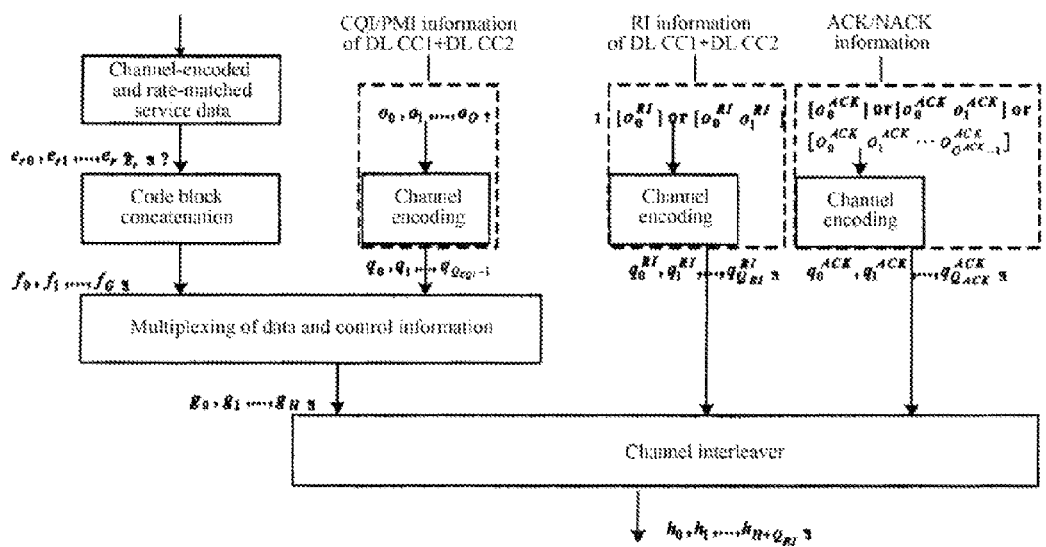
FIG. 9a is a schematic diagram of a process of multiplexing channel quality information of a plurality of carriers and uplink data according to a second embodiment of the invention.
Figure 9B:
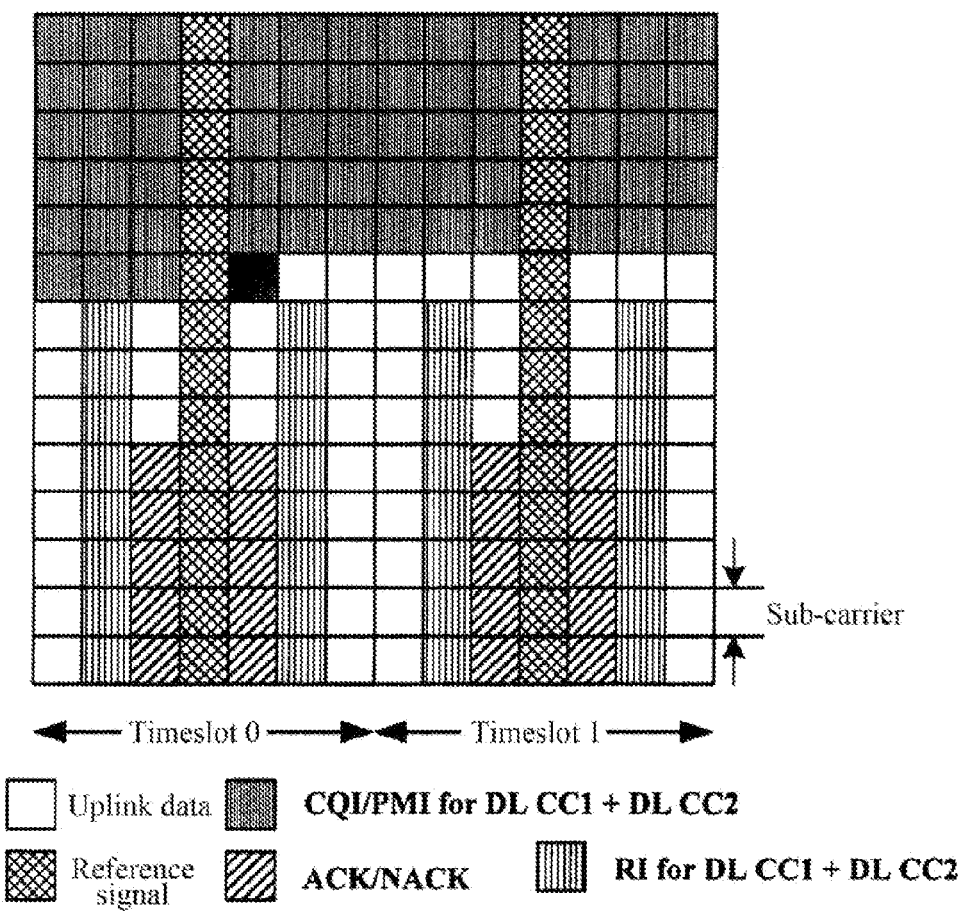
FIG. 9b is a schematic diagram of mapping a feedback of channel information of a plurality of carriers according to the second embodiment of the invention.

As illustrated in FIG. 9a and FIG. 9b, the CQI/PMI information of the respective carriers is encoded jointly, and also the RI information of the respective carriers is encoded jointly.

As illustrated in FIG. 9a, in this embodiment, possibly a code block concatenation process is performed on channel-encoded and rate-matched service data, and the CQI/PMI information of the downlink carriers in the set of downlink carriers is encoded jointly; the jointly encoded CQI/PMI information of the downlink carriers and the code block concatenation-processed service data are multiplexed; and an interleaving process is performed on the multiplexed data, the jointly encoded RI information of the downlink carriers and separately encoded ACK/NACK information.

As illustrated in FIG. 9b, in the mapping process, when the uplink data symbols are mapped onto the physical resource, firstly the joint CQI/PMI information of the respective carriers are mapped sequentially onto the physical resource per RE firstly in the time domain and then in the frequency domain while the same resource elements are occupied for the CQI/PMI information of the respective carriers, the uplink data is mapped onto the remaining physical resource, and the ACK/NACK and RI information is mapped onto the physical resource by puncturing the uplink data while the same resource elements are occupied for the joint RI information of the respective carriers.

Figure 10A:
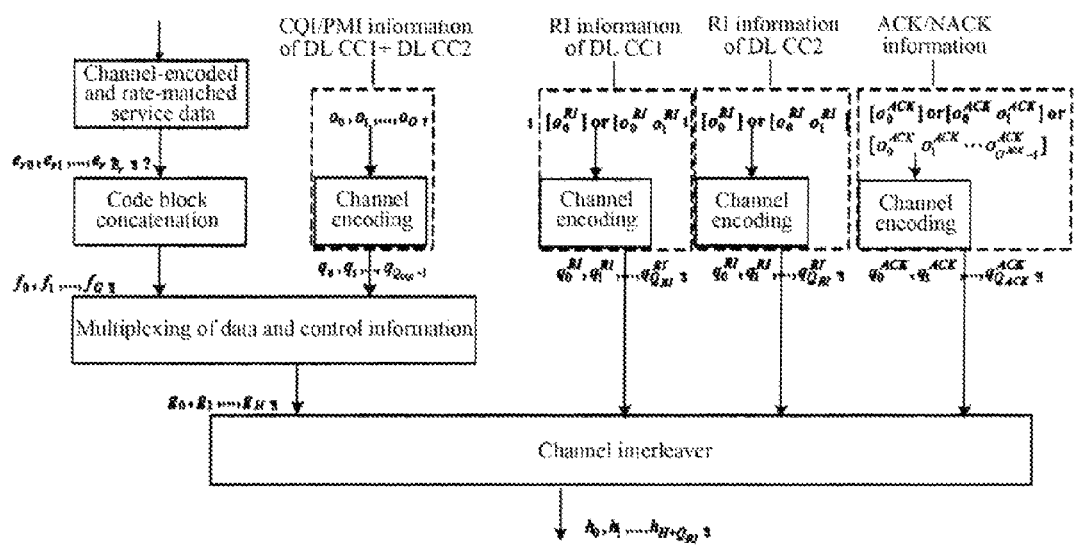
FIG. 10a is a schematic diagram of a process of multiplexing channel quality information of a plurality of carriers and uplink data according to a third embodiment of the invention.
Figure 10B:
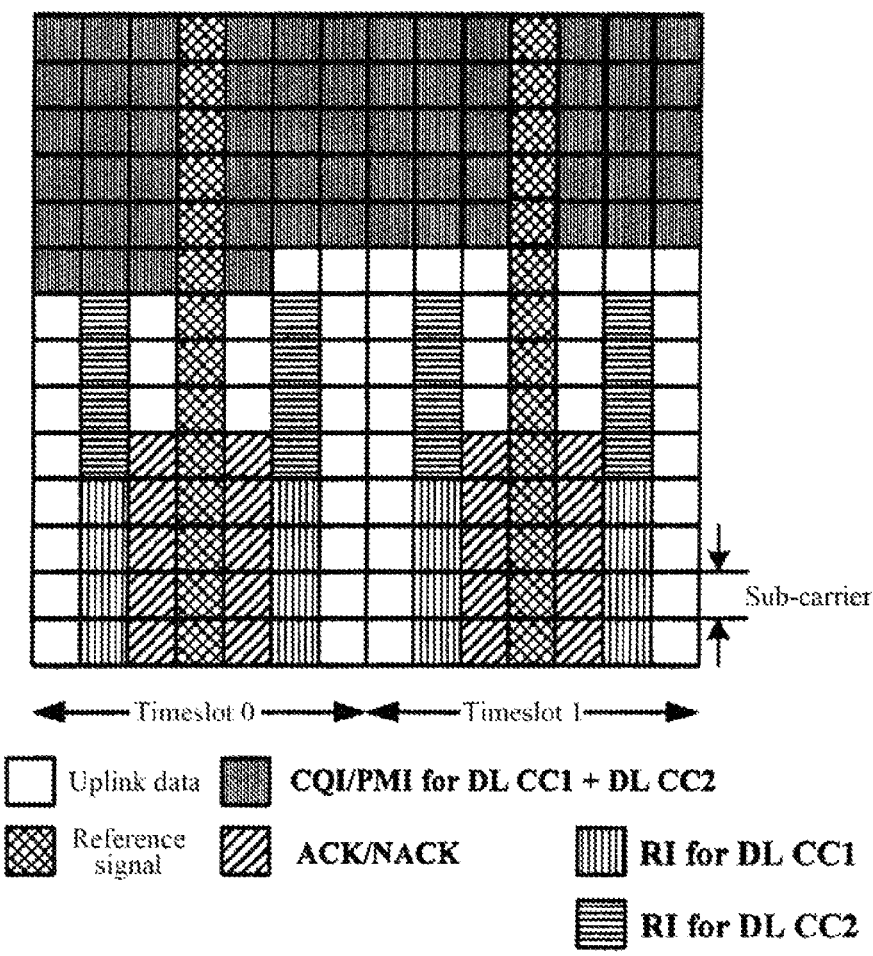
FIG. 10b is a schematic diagram of mapping a feedback of channel information of a plurality of carriers according to the third embodiment of the invention.

As illustrated in FIG. 10a and FIG. 10b, the CQI/PMI information of the respective carriers is encoded jointly, and also the RI information of the respective carriers is encoded separately.

As illustrated in FIG. 10a, in a third implementation, a code block concatenation process is performed on channel-encoded and rate-matched service data, and the CQI/PMI information of the downlink carriers in the set of downlink carriers is encoded jointly; the jointly encoded CQI/PMI information of the downlink carriers and the code block concatenation-processed service data are multiplexed; and an interleaving process is performed on the multiplexed data, the separately encoded RI information of the respective downlink carriers and separately encoded ACK/NACK information.

As illustrated in FIG. 10b, in the mapping process, firstly the joint CQI/PMI information of the respective carriers are mapped sequentially onto the physical resource per RE firstly in the time domain and then in the frequency domain while the same resource elements are occupied for the CQI/PMI information of the respective carriers, the uplink data is mapped onto the remaining physical resource, and the ACK/NACK and RI information is mapped onto the physical resource by puncturing the uplink data while different resource elements are occupied for the RI information of the respective carriers.

In the embodiments of the invention, CQI/PMI/RI information of a plurality of carriers can be fed back over a non-periodical PUSCH, and the channel information of the plurality of carriers can be multiplexed with uplink data and then transmitted to a base station. Particularly the CQI/PMI information of the respective CCs can be encoded separately and also RI information of the respective CCs can be encoded separately; the CQI/PMI information of the respective CCs can be encoded jointly and also RI information of the respective CCs can be encoded jointly; or the CQI/PMI information of the respective CCs can be encoded jointly and RI information of the respective CCs can be encoded separately.

Those skilled in the art shall appreciate that the embodiments of the invention can be embodied as a method, a system or a computer program product. Therefore the invention can be embodied in the form of an all-hardware embodiment, an al-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for feeding back channel information of a plurality of carriers, comprising the steps of:
    measuring, by a user equipment, channel information over a plurality of downlink carriers; and
    upon reception of an instruction to trigger a feedback of channel information transmitted from a base station, transmitting, by the user equipment, to the base station the measured channel information of corresponding downlink carriers in an obtained set of downlink carriers required to be measured and fed back;
    wherein the transmitting, by the user equipment to the base station, the measured channel information of the downlink carriers comprises:
    performing, by the user equipment, multiplexing and interleaving processes on the measured channel information of the downlink carriers and uplink data to be transmitted; and mapping uplink data symbols obtained after the interleaving process onto a corresponding physical resource for transmission; wherein:
    performing, by the user equipment, the multiplexing and interleaving processes on the measured channel information of the downlink carriers and the uplink data to be transmitted comprises:
    performing a code block concatenation process on channel-encoded and rate-matched service data, encoding jointly CQI information of the downlink carriers in the set of downlink carriers, and encoding jointly PMI information of the downlink carriers in the set of downlink carriers;
    multiplexing the jointly encoded CQI information of the downlink carriers, the jointly encoded PMI information of the downlink carriers and the code block concatenation-processed service data; and
    performing the interleaving process on the multiplexed data, RI information of the downlink carriers which is jointly encoded and ACK/NACK information of the respective downlink carriers which is encoded separately;
    or
    performing, by the user equipment, the multiplexing and interleaving processes on the measured channel information of the downlink carriers and the uplink data to be transmitted comprises:
    performing a code block concatenation process on channel-encoded and rate-matched service data, encoding jointly CQI information of the downlink carriers in the set of downlink carriers, and encoding jointly PMI information of the downlink carriers in the set of downlink carriers;
    multiplexing the jointly encoded CQI information of the downlink carriers, the jointly encoded PMI information of the downlink carriers and the code block concatenation-processed service data; and
    performing the interleaving process on the multiplexed data, RI information of the respective downlink carriers which is encoded separately and ACK/NACK information of the respective downlink carriers which is encoded separately;
    or
    performing, by the user equipment, the multiplexing and interleaving processes on the measured channel information of the downlink carriers and the uplink data to be transmitted comprises:
    performing a code block concatenation process on channel-encoded and rate-matched service data, and channel-encoding separately CQI information of the respective downlink carriers, and channel-encoding separately PMI information of the downlink carriers in the set of downlink carriers;

multiplexing the separately channel-encoded CQI information of the respective downlink carriers, the separately channel-encoded PMI information and the code block concatenation-processed service data; and performing the interleaving process on the multiplexed data, the RI information of the respective downlink carriers which is encoded separately and the ACK/NACK information of the respective downlink carriers which is encoded separately.

2. The method according to claim 1, wherein the set of downlink carriers required to be measured and fed back is obtained from received upper-layer signaling transmitted from the base station.

3. The method according to claim 1, wherein the channel information of the downlink carriers comprises several types of channel feedback information, and the instruction to trigger a feedback of channel information comprises a carrier indicator to indicate uplink carriers occupied for feeding back the respective types of channel information of the downlink carriers, and the user equipment transmits the measured channel information of the corresponding downlink carriers to the base station over the corresponding uplink carriers.

4. The method according to claim 1, wherein the instruction to trigger a feedback of channel information can be a Downlink Control Information (DCI) format 0.

5. The method according to claim 4, wherein the set of downlink carriers required to be measured and fed back is indicated in a plurality of bits extended in Channel Quality Indication (CQI) request signaling of the DCI format 0 in a bitmap mode.

6. The method according to claim 1, wherein the channel information of the downlink carriers comprises one or more of a Channel Quality Indication (CQI) a Pre-coding Matrix Indication (PMI) and a Rank Indication (RI).

7. The method according to claim 1,
wherein mapping the uplink data symbols obtained after the interleaving process onto the corresponding physical resource for transmission comprises:
when the uplink data symbols are mapped onto the physical resource, firstly mapping the CQI information and the PMI information of the respective carriers sequentially onto the physical resource per Resource Element, RE, firstly in the time domain and then in the frequency domain while different resource elements are occupied for the CQI information and PMI information of the respective carriers, mapping the uplink data onto the remaining physical resource, and mapping the ACK/NACK and RI information onto the physical resource by puncturing the uplink data.

8. The method according to claim 7, wherein the RI information is mapped onto Single Carrier-Frequency Division Multiple Access (SC-FDMAR) symbols on both sides of a Demodulation Reference Signal (DMRS) according to a rule in the LTE R8 by mapping the RI information of the different carriers to different resource elements in an order from low frequency to high frequency while the different resource elements are occupied for the RI information of the respective carriers.

9. The method according to claim 1,
wherein mapping the uplink data symbols obtained after the interleaving process onto the corresponding physical resource for transmission comprises: when the uplink data symbols are mapped onto the physical resource, firstly mapping the CQI information and the PMI information of the respective carriers sequentially onto the physical resource per RE firstly in the time domain and then in the frequency domain while the same resource elements are occupied for the CQI information and the PMI information of the respective carriers, mapping the uplink data onto the remaining physical resource, and mapping the ACK/NACK and RI information onto the physical resource by puncturing the uplink data while the same resource elements are occupied for the jointly encoded RI information of the respective carriers;

or wherein mapping the uplink data symbols obtained after the interleaving process onto the corresponding physical resource for transmission comprises: when the uplink data symbols are mapped onto the physical resource, mapping firstly the jointly encoded CQI information and the jointly encoded PMI information of the respective carriers sequentially onto the physical resource per RE firstly in the time domain and then in the frequency domain while the same resource elements are occupied for the jointly encoded CQI and the jointly encoded PMI information of the respective carriers, mapping the uplink data onto the remaining physical resource, and mapping the ACK/NACK and RI information onto the physical resource by puncturing the uplink data while the different resource elements are occupied for the separately encoded RI information of the respective carriers.

10. The method according to claim 1, wherein the user equipment further receives pairing condition information of the downlink carriers and uplink carriers notified from the base station, and then the user equipment transmits the measured channel information of the corresponding downlink carriers to the base station over the corresponding uplink carriers paired with the downlink carriers.

11. A device for feeding back channel information of a plurality of carriers, comprising:
a first receiver configured to receive a set of downlink carriers, required to be measured and fed back, transmitted from a base station;
a second receiver configured to receive an instruction to trigger a feedback of channel information transmitted from the base station;
a processor configured to measure channel information over a plurality of downlink carriers, and upon reception of the instruction to trigger a feedback of channel information transmitted from the base station, to transmit to the base station the measured channel information of the corresponding downlink carriers in an set of downlink carriers required to be measured and fed back;
wherein the processor is configured to perform multiplexing and interleaving processes on the measured channel information of the downlink carriers and uplink data to be transmitted; and to map uplink data symbols obtained after the interleaving process onto a corresponding physical resource for transmission, wherein:
the processor is configured to perform a code block concatenation process on channel-encoded and rate-matched service data, to encode jointly CQI information of the downlink carriers in the set of downlink carriers and to encode jointly PMI information of the downlink carriers in the set of downlink carriers; to multiplex the jointly encoded CQI information of the downlink carriers, the jointly encoded PMI information of the downlink carriers and the code block concatenation-processed service data; and to perform the interleaving process on the multiplexed data, RI information of the downlink carriers which is encoded jointly and ACK/NACK information which is encoded separately;

or the processor is configured to perform a code block concatenation process on channel-encoded and rate-matched service data, to encode jointly CQI information of the downlink carriers in the set of downlink carriers, and to encode jointly PMI information of the downlink carriers in the set of downlink carriers; to multiplex the jointly encoded CQI information of the downlink carriers, the jointly encoded PMI information of the downlink carriers and the code block concatenation-processed service data; and to perform the interleaving process on the multiplexed data, RI information of the respective downlink carriers which is encoded separately and ACK/NACK information of the respective downlink carriers which is encoded separately;

or the processor is configured to perform a code block concatenation process on channel-encoded and rate-matched service data, and channel-encoding separately CQI information of the respective downlink carriers, and channel-encoding separately PMI information of the downlink carriers in the set of downlink carriers, to multiplex the separately channel-encoded CQI information of the respective downlink carriers, the separately channel-encoded PMI information and the code block concatenation-processed service data, and to perform the interleaving process on the multiplexed data, the RI information of the respective downlink carriers which is encoded separately and the ACK/NACK information of the respective downlink carriers which is encoded separately.

12. The device according to claim 11, wherein the channel information of the downlink carrier comprises several types of channel feedback information, and the instruction to trigger a feedback of channel information comprises a carrier indicator to indicate uplink carriers occupied for feeding back the respective types of channel information of the downlink carriers, and then the processor is configured to transmit the measured channel information of the downlink carriers to the base station over the corresponding uplink carriers.

13. The device according to claim 11, wherein the processor is configured to transmit the measured channel information of the downlink carriers to the base station over corresponding uplink carriers paired with the downlink carriers according to pairing condition information, of the downlink carriers and the uplink carriers, notified from the base station.

14. The device according to claim 11, wherein the channel information of the downlink carriers comprises one or more of a CQI, a PMI and an RI.

15. A method for scheduling a feedback of channel information, comprising:

notifying, by a base station, a user equipment of a set of downlink carriers required to be measured and fed back;

transmitting, by the base station, to the user equipment a message to trigger downlink channel information to be measured, wherein the downlink channel information is channel information of downlink carriers in the set of downlink carriers; and receiving, by the base station, the channel information of the downlink carriers measured by the user equipment;

wherein the base station receiving the channel information of the downlink carriers measured by the user equipment comprises:

receiving, by the base station, the channel information of the downlink carriers through a corresponding physical resource, after the user equipment performing multiplexing and interleaving processes on the measured channel information of the downlink carriers and uplink data to be transmitted and mapping uplink data symbols obtained after the interleaving process onto the corresponding physical resource for transmission, wherein:

the user equipment performing the multiplexing and interleaving processes on the measured channel information of the downlink carriers and the uplink data to be transmitted comprises:

performing a code block concatenation process on channel-encoded and rate-matched service data, encoding jointly CQI information of the downlink carriers in the set of downlink carriers, and encoding jointly PMI information of the downlink carriers in the set of downlink carriers;

multiplexing the jointly encoded CQI information of the downlink carriers, the jointly encoded PMI information of the downlink carriers and the code block concatenation-processed service data; and performing the interleaving process on the multiplexed data, RI information of the downlink carriers which is jointly encoded and ACK/NACK information of the respective downlink carriers which is encoded separately;

or the user equipment performing the multiplexing and interleaving processes on the measured channel information of the downlink carriers and the uplink data to be transmitted comprises:

performing a code block concatenation process on channel-encoded and rate-matched service data, encoding jointly CQI information of the downlink carriers in the set of downlink carriers, and encoding jointly PMI information of the downlink carriers in the set of downlink carriers;

multiplexing the jointly encoded CQI information of the downlink carriers, the jointly encoded PMI information of the downlink carriers and the code block concatenation-processed service data; and performing the interleaving process on the multiplexed data, RI information of the respective downlink carriers which is encoded separately and ACK/NACK information of the respective downlink carriers which is encoded separately;

or the user equipment performing the multiplexing and interleaving processes on the measured channel information of the downlink carriers and the uplink data to be transmitted comprises:

performing a code block concatenation process on channel-encoded and rate-matched service data, and channel-encoding separately CQI information of the respective downlink carriers, and channel-encoding separately PMI information of the downlink carriers in the set of downlink carriers;

multiplexing the separately channel-encoded CQI information of the respective downlink carriers, the separately channel-encoded PMI information and the code block concatenation-processed service data; and performing the interleaving process on the multiplexed data, the RI information of the respective downlink carriers which is encoded separately and the ACK/NACK information of the respective downlink carriers which is encoded separately.

16. The method according to claim 15, wherein notifying, by the base station, the user equipment of the set of downlink carriers required to be measured and fed back comprises:
transmitting, by the base station, the set of downlink carriers to the user equipment in upper-layer signaling, wherein the upper-layer signaling is Radio Resource Control (RRC) signaling.

17. The method according to claim 15, wherein the message to trigger the downlink channel information to be measured is a DCI message.

18. The method according to claim 15, wherein receiving, by the base station, the channel information of the downlink carriers measured by the user equipment comprises:
de-interleaving, de-multiplexing and decoding extracted data symbols over a physical resource to obtain the channel information of the respective downlink carriers.

19. A device for scheduling a feedback of channel information, comprising:
a first transmitter configured to notify a user equipment of a set of downlink carriers required to be measured and fed back;
a second transmitter configured to transmit to the user equipment a message to trigger downlink channel information to be measured, wherein the downlink channel information is channel information of downlink carriers in the set of downlink carriers; and
a receiver configured to receive the channel information of the downlink carriers measured by the user equipment;
wherein the receiver is configured to receive the channel information of the downlink carriers through a corresponding physical resource, after the user equipment performing multiplexing and interleaving processes on the measured channel information of the downlink carriers and uplink data to be transmitted and mapping uplink data symbols obtained after the interleaving process onto the corresponding physical resource for transmission, wherein:
the user equipment performing the multiplexing and interleaving processes on the measured channel information of the downlink carriers and the uplink data to be transmitted comprises:
performing a code block concatenation process on channel-encoded and rate-matched service data, encoding jointly CQI information of the downlink carriers in the set of downlink carriers, and encoding jointly PMI information of the downlink carriers in the set of downlink carriers;
multiplexing the jointly encoded CQI information of the downlink carriers, the jointly encoded PMI information of the downlink carriers and the code block concatenation-processed service data; and
performing the interleaving process on the multiplexed data, RI information of the downlink carriers which is jointly encoded and ACK/NACK information of the respective downlink carriers which is encoded separately;
or
the user equipment performing the multiplexing and interleaving processes on the measured channel information of the downlink carriers and the uplink data to be transmitted comprises:
performing a code block concatenation process on channel-encoded and rate-matched service data, encoding jointly CQI information of the downlink carriers in the set of downlink carriers, and encoding jointly PMI information of the downlink carriers in the set of downlink carriers;
multiplexing the jointly encoded CQI information of the downlink carriers, the jointly encoded PMI information of the downlink carriers and the code block concatenation-processed service data; and
performing the interleaving process on the multiplexed data, RI information of the respective downlink carriers which is encoded separately and ACK/NACK information of the respective downlink carriers which is encoded separately;
or
the user equipment performing the multiplexing and interleaving processes on the measured channel information of the downlink carriers and the uplink data to be transmitted comprises:
performing a code block concatenation process on channel-encoded and rate-matched service data, and channel-encoding separately CQI information of the respective downlink carriers, and channel-encoding separately PMI information of the downlink carriers in the set of downlink carriers;
multiplexing the separately channel-encoded CQI information of the respective downlink carriers, the separately channel-encoded PMI information and the code block concatenation-processed service data; and
performing the interleaving process on the multiplexed data, the RI information of the respective downlink carriers which is encoded separately and the ACK/NACK information of the respective downlink carriers which is encoded separately.

* * * * *